United States Patent [19]

Henry

[11] Patent Number: 5,288,137

[45] Date of Patent: Feb. 22, 1994

[54] END GATE

[76] Inventor: Charles R. Henry, R.R. 2, Solomon, Kans. 67480

[21] Appl. No.: 872,594

[22] Filed: Apr. 23, 1992

[51] Int. Cl.⁵ ............................................. B60P 1/267
[52] U.S. Cl. ................... 298/23 DF; 296/56
[58] Field of Search ....................... 296/51, 52, 56; 298/23 D, 23 DF, 23 MD

[56] References Cited

U.S. PATENT DOCUMENTS

| | | | |
|---|---|---|---|
| 834,380 | 10/1906 | Hamilton . | |
| 1,483,890 | 2/1924 | Kelley | 296/51 |
| 1,790,379 | 1/1931 | Hughes . | |
| 1,843,685 | 2/1932 | Kissinger | 298/23 DF |
| 2,419,636 | 4/1947 | Foy | 298/23 DF |
| 2,732,252 | 1/1956 | Stekelenburg | 296/51 |
| 3,006,684 | 10/1961 | Reimer | 296/51 |
| 3,026,139 | 3/1962 | Ackermann | 296/56 |
| 3,361,476 | 1/1968 | Smock | 296/51 |
| 4,699,428 | 10/1987 | Vick | 298/23 MD |
| 4,989,918 | 2/1991 | Biddy | 298/23 MD |

*Primary Examiner*—Michael S. Huppert
*Assistant Examiner*—Janice Krizek
*Attorney, Agent, or Firm*—Zarley, McKee, Thomte, Voorhees & Sease

[57] ABSTRACT

An end gate is provided for a truck box which may be selectively automatically pivotally moved to an open position as the truck box is pivotally moved to its dumping position. A cable interconnecting the end gate and dump box is threaded through a series of pulleys to cause the end gate to pivot outwardly in response to upwardly movement of the dump box.

3 Claims, 6 Drawing Sheets

END GATE

BACKGROUND OF THE INVENTION

This invention relates to an end gate and more particularly to an end gate for a farm truck or the like.

Many types of end gates have been previously provided for farm trucks, grain carts, trailers, etc. The most common type of end gate for a farm truck is an end gate which completely closes the rearward end of the truck body and which has a vertically movable slide gate located in the lower central portion thereof which may be opened to permit grain to pass therethrough. Although end gates of the type described above work fairly well in some situations, it is frequently desirable to be able to dump the grain or the like from the truck body at a much greater rate than is possible through the small slide gate.

Many end gates have been previously provided which not only provide small slide gates at the lower central portion of the end gate but which provide a larger opening to facilitate faster dumping of the contents of the body. For example, see U.S. Pat. Nos. 834,380, 3,026,139, 1,790,379, and 4,699,428.

The instant invention is intended to overcome certain shortcomings of the prior art in that the end gate may be used for grain, gravel, silage, etc. Further, the end gate of the instant invention is believed to be much easier to use than the end gates of the prior art. Further, the instant invention is believed to have greater versatility than the end gates of the prior art.

SUMMARY OF THE INVENTION

An end gate is provided for a truck box or body pivotally mounted on a truck frame. A hydraulic lift means is provided to raise the truck body from its normal transport position to a dumping position. The truck body includes a horizontally disposed floor, an upstanding front wall, upstanding side walls, and an open rearward end. The end gate of this invention is mounted in the open rearward end of the truck body and normally closes the same to prevent the contents of the truck body from spilling therefrom. The end gate includes a small auger gate at the lower central portion thereof which may be used when the contents of the truck body are to be dumped into the hopper of an auger or the like. The end gate is pivotally movably mounted in the rearward end of the truck body and is selectively automatically pivotally opened when the truck body is moved from its transport position to its dumping position so that the contents of the truck body may be dumped in a rapid manner therefrom.

DESCRIPTION OF THE PREFERRED EMBODIMENT

Figure 1:
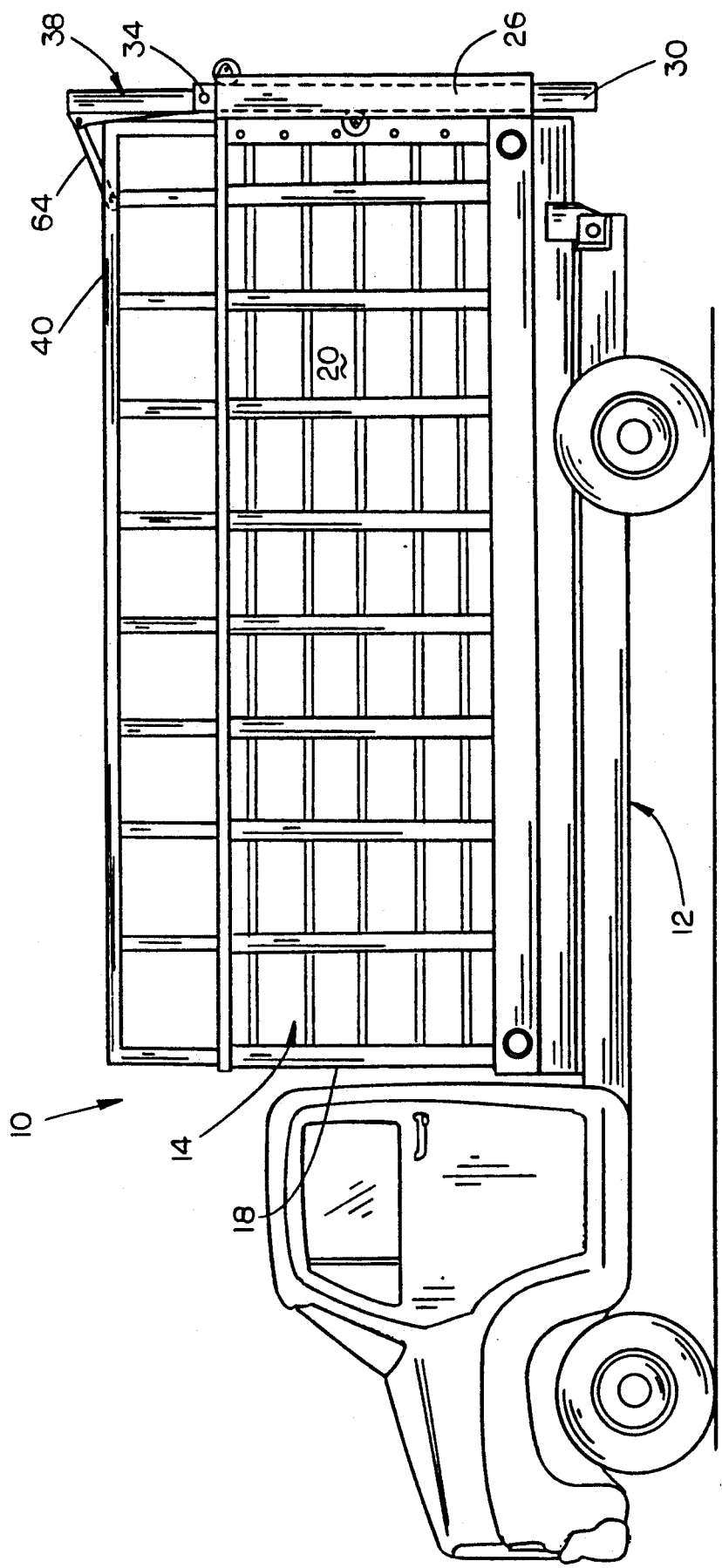
FIG. 1 is a side view of a truck having the end gate of this invention mounted thereon.

Referring to the drawings, the numeral 10 refers to a conventional farm truck including a wheeled frame means 12 having a truck body or box 14 mounted thereon. Truck body 14 is pivotally mounted on the frame means 12 in conventional fashion as illustrated in FIG. 2 so that the truck body 14 may be moved from the normal transport position of FIG. 1 to the dumping position of FIG. 2 to facilitate dumping of the contents therefrom. For purposes of description, truck body 14 includes a floor 16, upstanding front wall 18, opposite sides 20 and 22, and an open rearward end which is selectively closed by the end gate 24 of this invention.

Vertically disposed tubes 26 and 28 are mounted at the rearward ends of the side walls 20 and 22 respectively and have channel members 30 and 32 selectively movably mounted therein.

Figure 3:
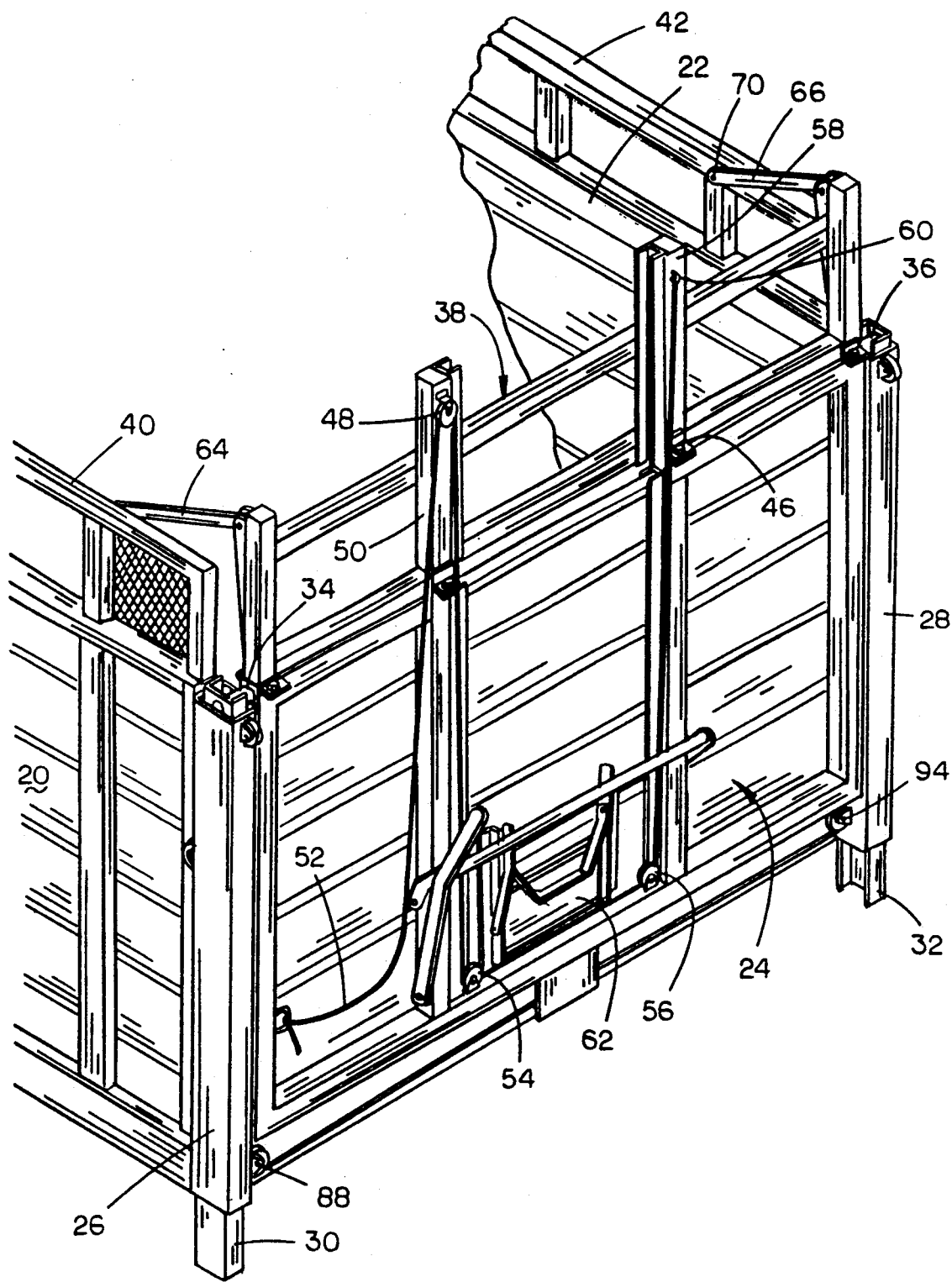
FIG. 3 is a partial perspective view of the end gate of this invention.
Figure 6:
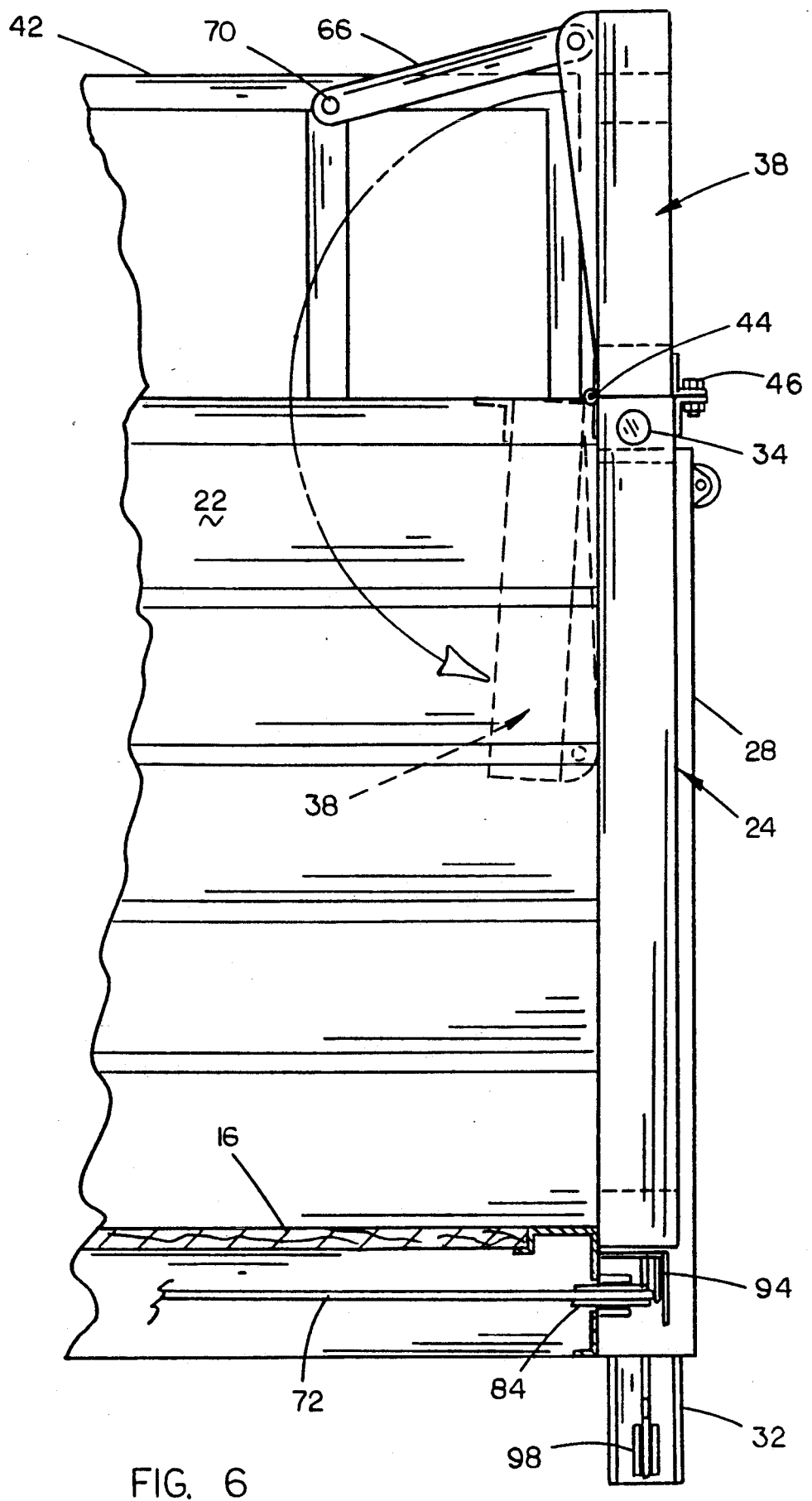
FIG. 6 is a side view of the end gate of this invention with the broken lines illustrating the alternate position to which the end gate extension may be pivotally moved.

End gate 24 is pivotally mounted to the upper ends of channel members 30 and 32 at 34 and 36 respectively as seen in FIG. 3. End gate 24 may include an extension 38 to increase the overall height of the end gate when extensions 40 and 42 are being utilized on the side walls 20 and 22. Extension 38 is pivotally connected to the upper end of end gate 24 at 44 (FIG. 6) and is locked into position by bolts 46 as seen in FIGS. 3 and 6. Pulley 48 is mounted on extension brace 50 and has rope 52 extending therearound as seen in FIG. 3. Rope 52 also extends around pulleys 54 and 56 as seen in FIG. 3 and then extends upwardly to the upper end of extension brace 58 where it is connected at 60. Pulleys 54 and 56 are mounted on the auger gate 62 so that the auger gate will be vertically moved when the rope 52 is pulled.

As seen in FIG. 6, extension 38 may be pivotally moved to the position illustrated by broken lines when the extensions are not being utilized. However, assuming that the extension 38 is used, links 64 and 66 pivotally connect the upper ends of the extension 38 with the truck body at two locations, respectively, one of the locations shown at 70.

Figure 4:
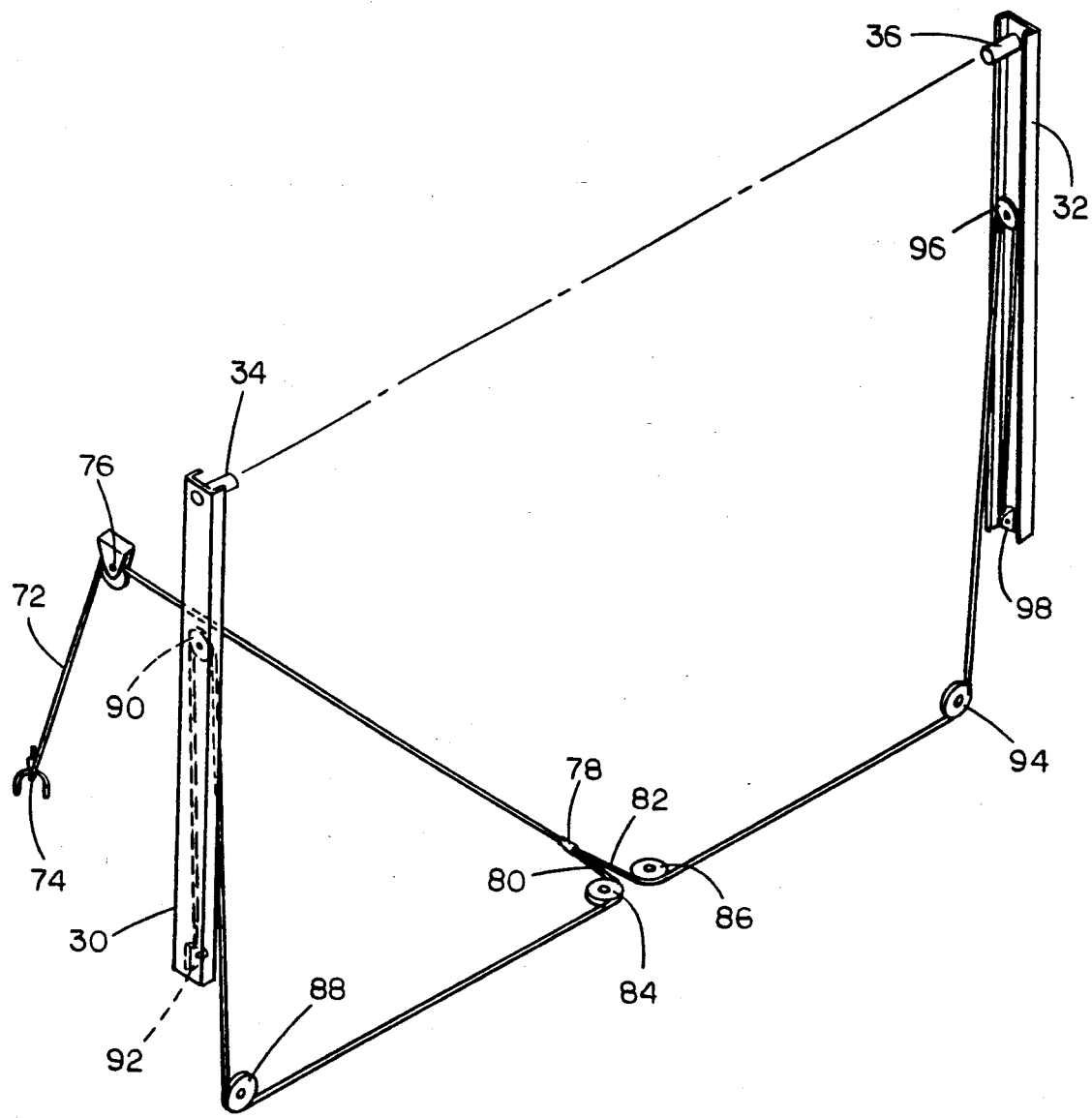
FIG. 4 is a partial perspective view illustrating the manner in which the end gate support channels are raised with respect to the truck body so that the end gate is pivotally moved to its open position.
Figure 5:
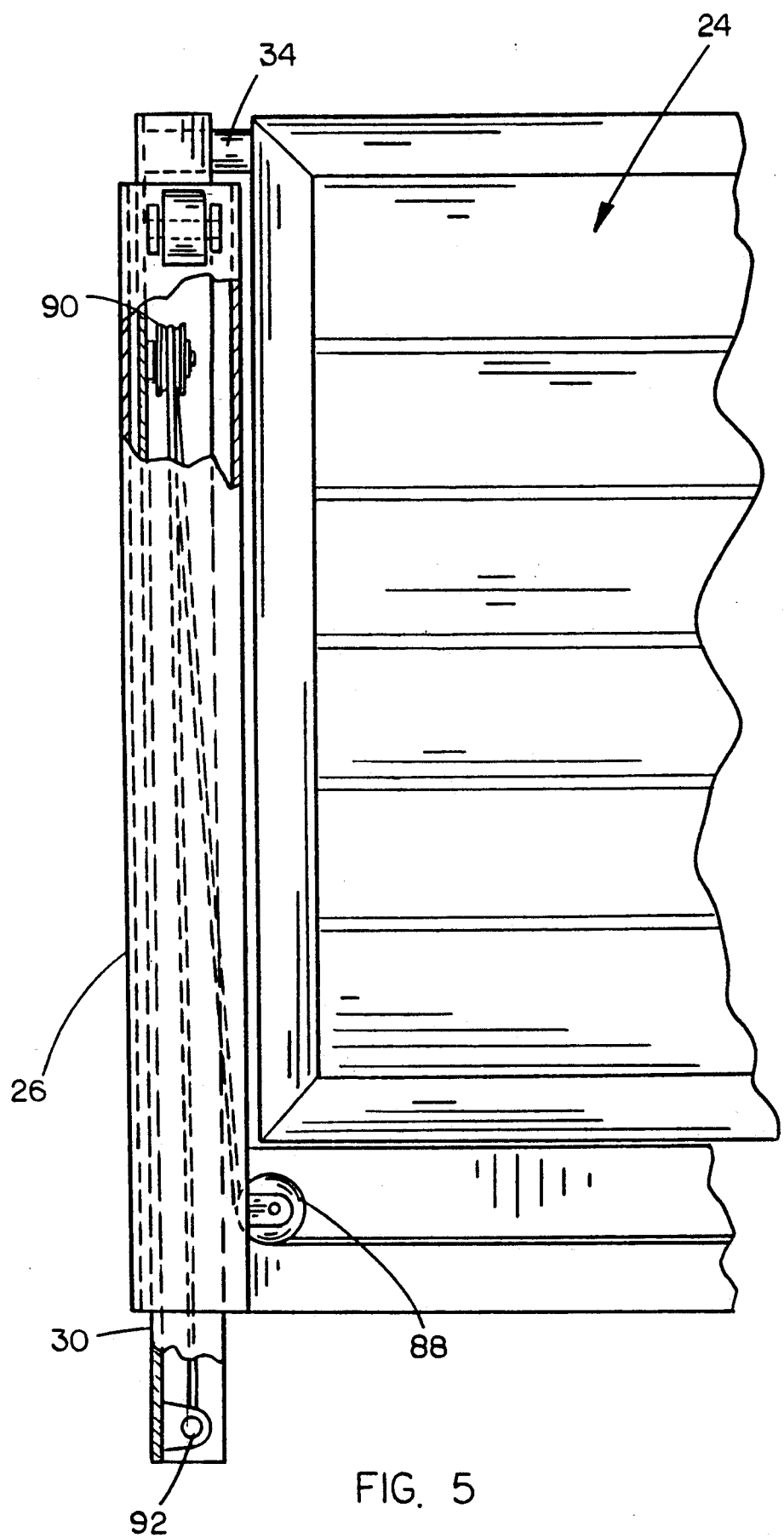
FIG. 5 is a side elevational view of the end gate with portions thereof cut away to more fully illustrate the invention.

Cable 72 is secured to the wheeled frame means 12 at 74 and extends upwardly around a pulley 76 connected to the underside of the truck body 14. Cable 72 then extends rearwardly to a clevis means 78 located at the rear of the box. Cables 80 and 82 are removably connected to the clevis means 78 and extend rearwardly therefrom as seen in FIG. 4 and thence around pulleys 84 and 86 respectively. Cable 80 extends laterally from pulley 84 and extends around pulley 88 which is secured to the inside surface of tube 26. Cable 80 then extends upwardly through the interior of tube 26 and then extends over pulley 90 which is rotatably mounted on channel 32 inside tube 26. Cable 80 then extends downwardly from pulley 90 to the bottom of channel member 30 where it is connected thereto at 92. Similarly, cable 82, after extending around pulley 86, extends to pulley 94 which is secured to the inside surface of tube 28. Cable 82 then extends upwardly through tube 28, thence around pulley 96 which is secured to channel 32 inside tube 28, thence downwardly for connection to the lower end of channel member 32 at 98. Removable locking pins are provided to maintain the lower end of the end gate 24 in position when the dump body is in its transport position and when it is desired to dump only through the slide gate 62.

Assuming that the extension 38 is in its extended position and assuming that it is desired to dump the contents of the truck box 14 from the small auger gate 62, rope 52 is pulled to open the slide gate 62. The box 14 will then be raised by means of the conventional hydraulic cylinder to enable the contents of the box to be dumped through the slide gate 62. If the extension 38 is not needed, the extension 38 is folded to the position illustrated by broken lines in FIG. 6. The small auger gate 62 may still be raised by pulling on the rope 52 even though the extension 38 is in its non-extended position.

Figure 2:
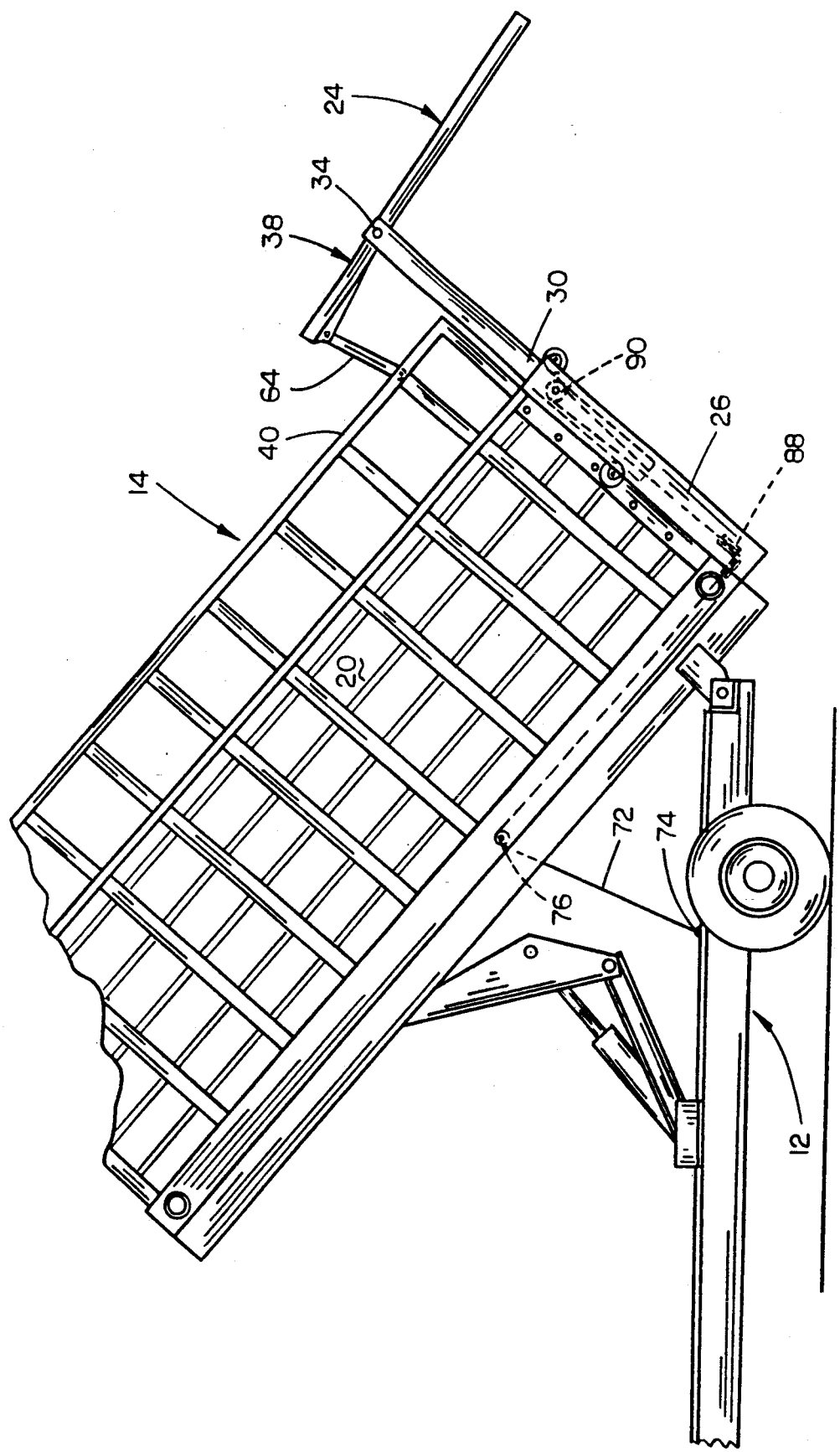
FIG. 2 is a side view similar to FIG. 1 except that the truck body has been moved to its dumping position with the end gate having been automatically moved to its open position.

Assuming further that the extension 38 is in its extended position, after the locking pins have been removed from the lower end of the end gate 24, the truck box 14 is pivotally moved from the position of FIG. 1 to the position of FIG. 2. As the truck box 14 is raised, cable 72 will be pulled forwardly which will cause the cables 80 and 82 to pull the channel members 30 and 32 upwardly with respect to the tubes 26 and 28. The upward movement of the channel members 30 and 32 in the tubes 26 and 28 as the box 14 is being moved to its dumping position, will also cause the lower end of the end gate 24 to pivotally move outwardly from the truck box 14 as illustrated in FIG. 2 so that the entire rearward end of the truck box 14 is open to facilitate the dumping of silage or like therefrom. The pivotal movement of the end gate 24 is caused by the pivotal connection of the links 64 and 66. If the extension 38 is in its folded condition, suitable links would be extended from the upper end of the end gate 24 to the box 14 to cause a similar pivotal movement of the end gate 24. It is important to note that whether the extensions are used or not, the upper end of the end gate 24 will be pivotally connected by suitable links to the truck box so that the end gate 24 will be pivotally moved relative to the truck box as the truck box is raised and lowered.

If it is not desired to pivot the end gate 24 to the completely open position as illustrated in FIG. 2 but it is desired only to use the slide gate 62, the clevis connection 78 would be disconnected so that the cables 80 and 82 would be separated from the cable 72. The separation of the clevis connection 78 will prevent the end gate 24 from pivotally moving to the position of FIG. 2 during the dumping operation.

Thus it can be seen that a novel end gate has been provided for a truck box or the like which is automatically pivotally moved to an open position as the truck box is raised to its dumping position. It can also be seen that the end gate of this invention is quite versatile and is easy to use. Thus, it can be seen that the invention accomplishes at least all of its stated objectives.

I claim:

1. In combination, a wheeled frame means having rearward and forward ends, a dump body pivotally mounted on said wheeled frame means, means for pivotally moving said dump body with respect to said wheeled frame means, said dump body including a floor having rearward and forward ends, and opposite sides, an upstanding front wall, upstanding side wall, and an open rearward end, an upstanding end gate means normally closing said open rearward end, said end gate means being pivotally mounted on said dump body and being movable from a normally closed position to an open position whereby the contents of said dump body may pass through the open rearward end of said dump body, and means for automatically pivotally moving said end gate means to its open position in response to movement of said dump body as the dump body is raised with respect to said wheeled frame means, said end gate means being also vertically movable with respect to said dump body and wherein said means for automatically pivotally moving said end gate means also automatically vertically moves said end gate means with respect to said dump body when said dump body is raised with respect to said wheeled frame means.

2. In combination, a wheeled frame means having rearward and forward ends, a dump body pivotally mounted on said wheeled frame means, means for pivotally moving said dump body with respect to said wheeled frame means, said dump body including a floor having rearward and forward ends, and opposite sides, an upstanding front wall, upstanding side walls, and an open rearward end, an upstanding end gate means normally closing said open rearward end, said end gate means being pivotally mounted on said dump body and being movable from a normally closed position to an open position whereby the contents of said dump body may pass through the open rearward end of said dump body, said end gate means being vertically movable with respect to said dump body, and means for automatically pivotally moving said end gate means to its open position when said dump body is raised with respect to said wheeled frame means, said means for automatically pivotally moving said end gate means also automatically vertically moves said end gate means with respect to said dump body when said dump body is raised with respect to said wheeled frame means, said means for automatically pivotally moving said end gate means comprises a cable means operatively interconnecting said frame means and said end gate means.

3. The combination of claim 2 wherein said cable means may be selectively disconnected from said end gate means to permit the dump body to be raised without opening said end gate means.

* * * * *